US009674869B2

(12) United States Patent
Damnjanovic

(10) Patent No.: US 9,674,869 B2
(45) Date of Patent: Jun. 6, 2017

(54) APPARATUS AND METHOD FOR FAST ACCESS IN A WIRELESS COMMUNICATION SYSTEM

(75) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 11/686,953

(22) Filed: Mar. 15, 2007

(65) Prior Publication Data

US 2008/0019306 A1 Jan. 24, 2008

Related U.S. Application Data

(60) Provisional application No. 60/784,740, filed on Mar. 20, 2006.

(51) Int. Cl.
*H04W 4/00* (2009.01)
*H04W 74/00* (2009.01)
*H04W 74/08* (2009.01)

(52) U.S. Cl.
CPC ...... *H04W 74/002* (2013.01); *H04W 74/0833* (2013.01); *H04W 74/0866* (2013.01)

(58) Field of Classification Search
CPC . H04W 74/0833; H04W 5/50; H04W 74/002; H04W 52/143; H04W 52/146; H04W 52/325; H04W 72/1278; H04W 52/08; H04W 52/16; H04W 52/286; H04W 52/30; H04W 52/48; H04W 72/0473; H04W 76/027; H04W 36/0077; H04W 74/0866; H04L 1/1858

USPC .... 370/329, 332, 333, 441, 341, 431, 395.3, 370/447, 395.21; 455/434, 515
See application file for complete search history.

(56) References Cited

U.S. PATENT DOCUMENTS 6,225,888 B1 * 5/2001 Juopperi ................. 340/5.8
6,256,301 B1   7/2001 Tiedemann, Jr. et al.
6,584,089 B1 * 6/2003 Honkasalo et al. .......... 370/338
(Continued)

FOREIGN PATENT DOCUMENTS

EP    1581020      9/2005
JP    2003529275 A 9/2003
(Continued)

OTHER PUBLICATIONS

International Search Report—PCT/US07/064409, International Search Authority—European Patent Office, Sep. 28, 2007.
(Continued)

*Primary Examiner* — Charles Appiah
*Assistant Examiner* — Edward Zhang
(74) *Attorney, Agent, or Firm* — Ashish L. Patel

(57) ABSTRACT

Systems and methodologies are described that facilitate a fast access in a wireless communication system, such as OFDMA. According to various aspects, the system and methods are described for transmitting an access probe, receiving a first grant message, wherein the first grant message comprises a portion representing a first identification, transmitting a message using a second identification, wherein the second identification is not equal to the first identification. Also, generating an access grant in response to receiving the access probe wherein the access grant comprising a portion representing a first identification.

24 Claims, 9 Drawing Sheets

(56) References Cited

U.S. PATENT DOCUMENTS

| | | | |
|---|---|---|---|
| 6,643,318 B1 | 11/2003 | Parsa et al. | |
| 7,164,918 B2 | 1/2007 | Moulsley et al. | |
| 7,342,901 B1* | 3/2008 | Zhang et al. | 370/329 |
| 7,624,431 B2 | 11/2009 | Cox et al. | |
| 2004/0001429 A1* | 1/2004 | Ma et al. | 370/210 |
| 2004/0160916 A1* | 8/2004 | Vukovic et al. | 370/332 |
| 2004/0192375 A1* | 9/2004 | Cho | H04W 60/005 |
| | | | 455/550.1 |
| 2004/0205158 A1 | 10/2004 | Hsu | |
| 2004/0213214 A1* | 10/2004 | Jung et al. | 370/352 |
| 2005/0014508 A1* | 1/2005 | Moulsley et al. | 455/450 |
| 2005/0020213 A1* | 1/2005 | Azman et al. | 455/67.11 |
| 2005/0180362 A1* | 8/2005 | Chin et al. | 370/335 |
| 2005/0197136 A1* | 9/2005 | Friday et al. | 455/456.1 |
| 2005/0289236 A1* | 12/2005 | Hull et al. | 709/231 |
| 2006/0030309 A1* | 2/2006 | Lee et al. | 455/422.1 |
| 2006/0040702 A1 | 2/2006 | Willenegger et al. | |
| 2006/0067526 A1* | 3/2006 | Faccin | H04L 9/0844 |
| | | | 380/46 |
| 2006/0184795 A1* | 8/2006 | Doradla et al. | 713/167 |
| 2006/0248252 A1* | 11/2006 | Kharwa | 710/303 |
| 2007/0019609 A1* | 1/2007 | Anjum | 370/349 |

FOREIGN PATENT DOCUMENTS

| | | |
|---|---|---|
| RU | 2233033 | 7/2004 |
| WO | 0105050 | 1/2001 |
| WO | WO0173970 A2 | 10/2001 |

OTHER PUBLICATIONS

Written Opinion—PCT/US2007/064409, International Search Authority, European Patent Office, Sep. 28, 2007.

IEEE Standard for Local and Metropolitan Area Networks, Part 16: Air Interface for Fixed and Mobile Broadband Wireless Access Systems, "Network Entry and Initialization" Section 6.3.9 of 802.16, p. 186-195 (2005).

QUALCOMM Europe, "Access Procedures", 3GPP TSG-RAN WG2 R2-060996, Mar. 31, 2006, All pages.

QUALCOMM Europe, "Characteristics of UL Access Channel 1", 3GPP TSG-RAN WG1 LTE Ad Hoc, R1-060181, Jan. 25, 2006, pp. 1-3.

Taiwan Search Report—TW096109820—TIPO—Mar. 19, 2012.

* cited by examiner

APPARATUS AND METHOD FOR FAST ACCESS IN A WIRELESS COMMUNICATION SYSTEM

CROSS-REFERENCE TO RELATED APPLICATION

This application claims the benefit of U.S. provisional application Ser. No. 60/784,740, filed on Mar. 20, 2006, and entitled A FAST ACCESS METHOD. The entirety of this application is incorporated herein by reference.

BACKGROUND

1. Field

The following description relates generally to wireless communications, and more particularly to schemes for fast access of resources.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

In a Long Term Evolution (LTE) systems, a random access channel (RACH) may be used when a terminal or user equipment (UE) requires resources for establishing a connection with base station (for example Node B or access network). The random access channel parameters are periodically broadcasted by Node B on the downlink common control channel (CCCH). UE may transmit over RACH only after it achieves downlink synchronization and obtains the most current RACH parameters. The RACH is also used for Uplink layer 1 synchronization and requesting uplink air link resource assignment. In the orthogonal nature of the uplink air interface (for example OFDM or OFDMA systems), it may be necessary that RACH resources be reserved and used only for access. Utilization of RACH is bursty and may be much lower than the utilization of the scheduled traffic data channel. Therefore, a need exists that minimum data be transmitted on RACH while ensuring short access delays.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of fast access in a wireless communication system, the method comprising generating an access probe comprising an access preamble having a quality of service information and transmitting the access probe on a random access channel.

In accordance with another aspect, a method of fast access in a wireless communication system, the method comprising receiving an access probe, the access probe comprising a quality of service information, generating an access grant in response to the received access probe, scrambling the access grant using information from the access probe, and transmitting the access grant.

According to another aspect, an apparatus operable in a wireless communication system, the apparatus comprises: means for transmitting an access probe; means for receiving a first access grant, wherein a portion of the first access grant is set to null; and means for transmitting user data along with a first MAC ID if the user data is transmitted after receiving the first access grant.

In another aspect, an apparatus operable in a wireless communication system, the apparatus comprises: means for receiving an access probe; means for generating an access grant in response to receiving the access probe wherein the access grant comprising a portion of the access grant set to null; and means for receiving user data and a first MAC ID.

In accordance with still another aspect, a computer readable medium has stored thereon computer executable instructions for performing the following instructions: transmitting an access probe; receiving a first access grant, wherein a portion of the first access grant is set to null; and transmitting user data along with a first MAC ID if the user data is transmitted after receiving the first access grant.

In another aspect, a computer readable medium has stored thereon computer executable instructions for performing the following instructions: receiving an access probe; generating an access grant in response to receiving the access probe wherein the access grant comprising a portion of the access grant set to null; and receiving user data and a first MAC ID.

According to yet another aspect, an integrated circuit comprises: means for transmitting an access probe; means for receiving a first access grant, wherein a portion of the first access grant is set to null; and means for transmitting user data along with a first MAC ID if the user data is transmitted after receiving the first access grant.

In another aspect, an integrated circuit comprises: means for receiving an access probe; means for generating an access grant in response to receiving the access probe wherein the access grant comprising a portion of the access grant set to null; and means for receiving user data and a first MAC ID.

In accordance with yet another aspect, an electronic device operable in a wireless communication system, comprises: a transmitter, the transmitter transmitting an access probe; a receiver, the receiver receiving a first access grant, wherein a portion of the first access grant is set to null; and the transmitter further transmitting user data along with a first MAC ID if the user data is transmitted after receiving the first access grant.

Yet in another aspect, In accordance with an aspect, a method of fast access in a wireless communication system, comprising: transmitting an access probe; receiving a first grant message, wherein the first grant message comprises a portion representing a first identification; and transmitting a message using a second identification, wherein the second identification is not equal to the first identification.

According to yet another aspect, a method of fast access in a wireless communication system, comprises: receiving an access probe; generating an access grant in response to receiving the access probe wherein the access grant comprising a portion representing a first identification; and receiving a message comprising a second identification that not equal to the transmitted first identification.

According to another aspect, an apparatus operable in a wireless communication system, the apparatus comprises: means for transmitting an access probe; means for receiving a first grant message, wherein the first grant message comprises a portion representing a first identification; and means for transmitting a message using a second identification, wherein the second identification is not equal to the first identification.

Another aspect relates to an apparatus operable in a wireless communication system, comprising: means for receiving an access probe; means for generating an access grant in response to receiving the access probe wherein the access grant comprising a portion representing a first identification; and means for receiving a message comprising a second identification that not equal to the transmitted first identification.

Yet another aspect relates to a computer readable medium having stored thereon computer executable instructions for performing the following instructions: transmitting an access probe; receiving a first grant message, wherein the first grant message comprises a portion representing a first identification; and transmitting a message using a second identification, wherein the second identification is not equal to the first identification.

Another aspect provides for a computer readable medium having stored thereon computer executable instructions for performing the following instructions: receiving an access probe; generating an access grant in response to receiving the access probe wherein the access grant comprising a portion representing a first identification; and receiving a message comprising a second identification that not equal to the transmitted first identification.

Still yet another aspect relates to an integrated circuit comprising: means for transmitting an access probe; means for receiving a first grant message, wherein the first grant message comprises a portion representing a first identification; and means for transmitting a message using a second identification, wherein the second identification is not equal to the first identification.

According to yet another aspect, an integrated circuit comprises: means for receiving an access probe; means for generating an access grant in response to receiving the access probe wherein the access grant comprising a portion representing a first identification; and means for receiving a message comprising a second identification that not equal to the transmitted first identification.

According to another aspect, an electronic device operable in a wireless communication system, the electronic device comprises: a transmitter, the transmitter transmitting an access probe; a receiver, the receiver receiving a first grant message, wherein the first grant message comprises a portion representing a first identification; and the transmitter transmitting a message using a second identification, wherein the second identification is not equal to the first identification.

Yet another aspect relates to an electronic device operable in a wireless communication system, comprises comprising: a receiver, the receiver receiving an access probe; a processor, the processor generating an access grant in response to receiving the access probe wherein the access grant comprising a portion of the access grant set to null representing a first identification; and the receiver further receiving user data and a first MAC ID a message comprising a second identification that not equal to the transmitted first identification.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
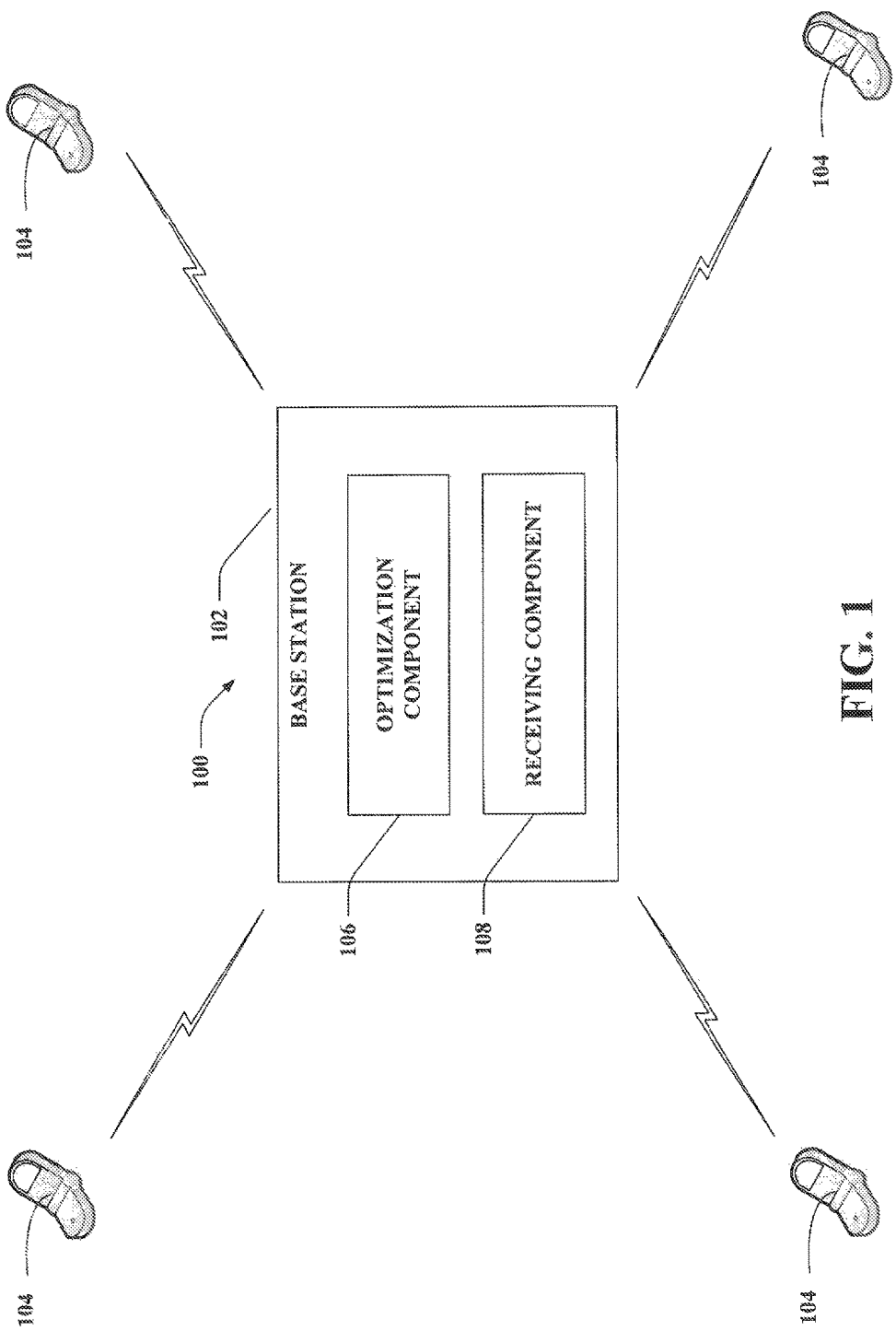
FIG. 1 is an illustration of an example system that effectuates optimal downlink transmission in a wireless communication environment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.) smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of sorting, containing, and/or carrying instruction(s) and/or data.

Referring now to FIG. 1, a system 100 that effectuates optimal downlink transmission in a wireless communication environment is illustrated in accordance with various embodiments herein. Base station 102 is configured to communicate with one or more mobile devices 104. Base station 102 is comprised of an optimization component 106 that allows for multiplexing of localized and distributed transmissions, and a receiving component 108 that, for example, receives information regarding base station capabilities. Optimization component 106 allows for downlink transmission such that frequency diversity is achieved and overhead costs associated with the transmission are mitigated via various schemes, as discussed infra. As can be appreciated, multiplexing of localized and distributed transmissions allows for accommodation of various traffic services, user abilities and further allows a user of the one or more mobile devices 104 to take advantage of channel properties. Moreover, for example, the one or more mobile devices 104 can provide the optimization component 106 at the base station 102 with information related to mobile device capabilities, an estimate of downlink channel conditions, and subscriber data. It is also to be appreciated that the base station 102 can determine a percentage of high speed versus low speed users, store subscriber data and information related to mobile device capabilities. Such capabilities of base station 102 can further allow optimization component 106 to choose the optimal multiplexing scheme according to surrounding conditions.

Figure 2:
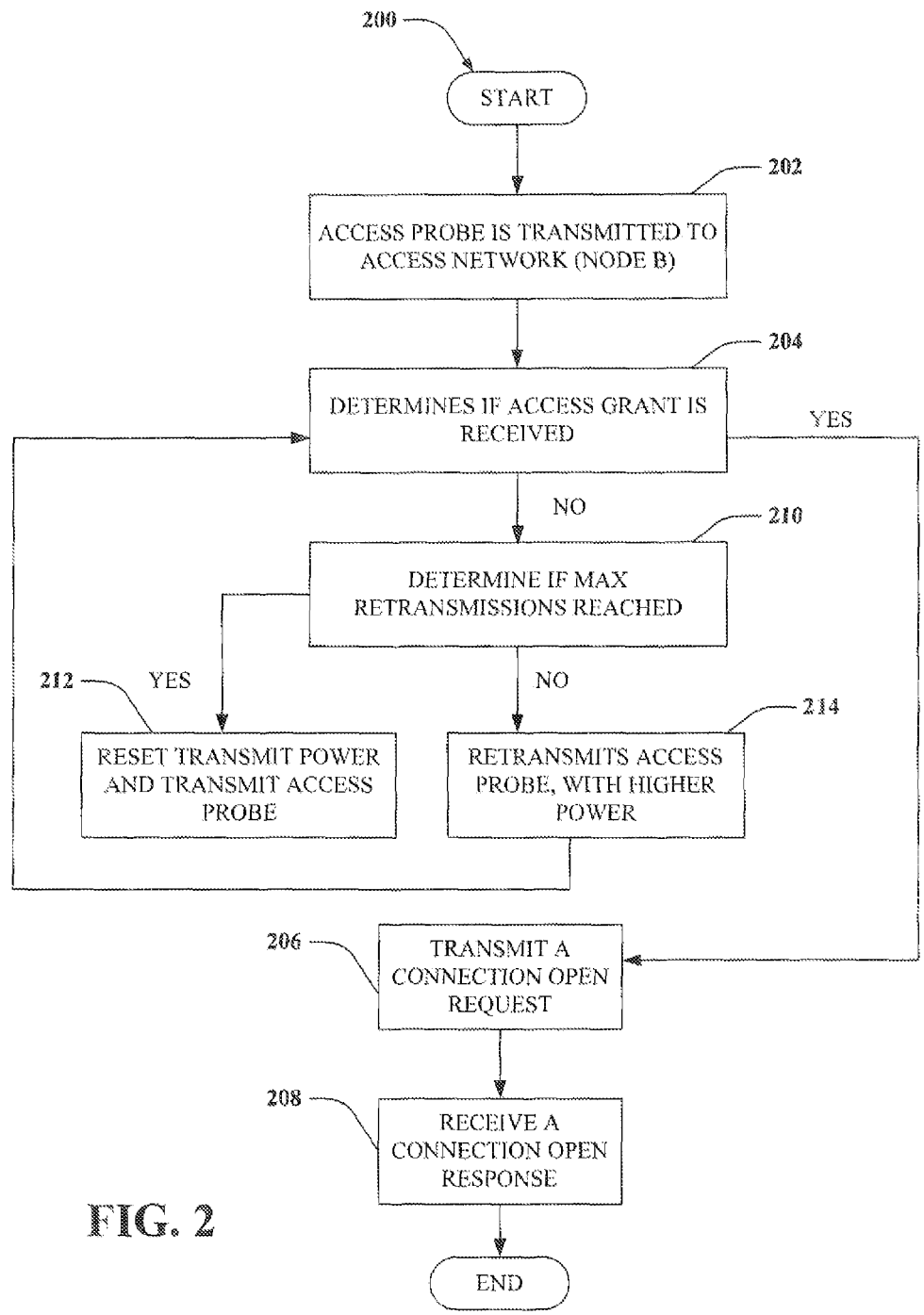
FIG. 2 is an illustration of an example methodology that facilitates a type of system employed by an access point in a wireless communications system.
Figure 3:
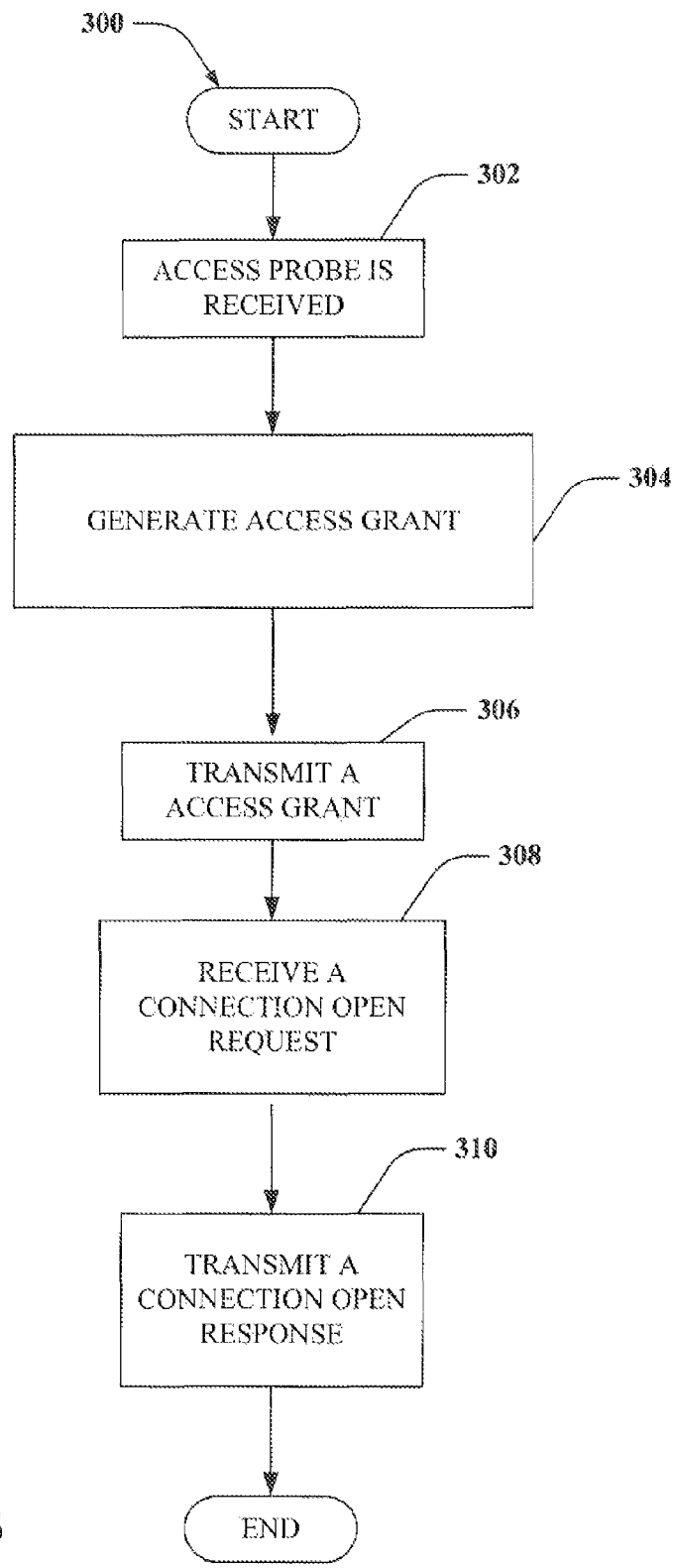
FIG. 3 is an illustration of an example methodology that facilitates a type of system employed by an access terminal in a wireless communications system.

Referring to FIGS. 2-3, methodologies relating to a fast access communication system are illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and describe herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 2, a methodology 200 that facilitates a fast access procedure in a wireless communication system (for example, OFDM or OFDMA systems) is illustrated. The method may be used for initial access, synchronization when terminal has lost synchronization or is not in sync with access network, or handoff. The method starts at 202, an access probe is transmitted to the access network (Node B). In an aspect, the access probe is transmitted on random access channel (RACH). To minimize the use of uplink resources, only a preamble is transmitted. The preamble may include downlink C/I information (enables power control of an access grant message sent on the downlink in response to access probe, discussed below), channel quality indicator feedback, QoS related information (enables scheduler to select and/or prioritize initial resource assignment), Random ID (reduces probability that identical access probes from different UEs arrive at Node B at the same time) and Cell ID (used for scrambling access probe so that the probe is decoded successfully at the target Node B only). An access probe preamble comprises of an access sequence. The access sequence is derived from UE's downlink C/I, QoS info and/or a random number used to avoid possible collisions. In an aspect, all access sequences are orthogonal. The access sequence is scrambled before transmission by the cell specific scrambling sequence. In another aspect, scrambling sequence is not only a function of cell ID but also in addition to cell ID a function of MAC ID (any sort of UE ID is sufficient).

In an aspect, after transmitting the access probe the method moves to 204, a determination is made as to whether an access grant is received in response to the access probe. If access grant is received, the method moves to 206 after decoding the access grant using information from the access probe. At 206, a connection open request message (for example, ConnectionOpenRequest) is transmitted and the method waits for response. At 208, a connection open response message (ConnectionOpenResponse) is received in response to the connection open request message. In another aspect, if the terminal is already assigned a MAC ID (for example when terminal is active state), method described at 206 and 208 may be eliminated and the terminal may start exchanging data with access network.

Referring back to 204, if the access grant is not received after a predetermined time, the method moves to 210. At 210, a determination is made as to whether a predetermined maximum number of retransmissions are reached. If the maximum number of retransmissions of access probe have occurred, then method moves to 212. At 212, transmit power is reset to original level and access probe is retransmitted. The method moves to 204 to check if the access grant is received. If the maximum number of retransmission of access probe was not reached, the method moves to 214. At 214, the access probe is retransmitted with higher power. The method moves to 204 to check if the access grant is received.

With reference now to FIG. 3, an example methodology 300 that facilitates a receiving an access probe a wireless communications system is illustrated. The method begins at 302, an access probe comprising an access sequence is received. If the access probe is successfully detected, then the method moves to 304. At 304, the access network generates an access grant. The access grant is associated with the access probe and uses information from the received access probe. The access network determines the parameters to provide to the terminal associated with the access probe to the terminal to exchange data with the access network. The access grant, among other things, comprises terminal MAC ID, uplink resource assignment and uplink adjustments. The access grant may be scrambled and protected using error correction schemes. If the access grant is transmitted on a broadcast channel to several terminals, then it may be scrambled using information from access probe, such that only the requestor is able decode the access grant. For example, the Node B scrambles the access grant with access preamble sequence it has received. Only the UE that selected the corresponding access preamble sequence may decode the access grant. After the access grant is generated, at 306, the method transmits the access grant and waits for request for an open connection. At 308, the open connection request message is received. After authenticating the terminal, at 310, the open connection response message is transmitted.

In another aspect, methodologies illustrated in FIG. 2-3 may be applied for handoff scheme. The UE negotiates handoff with the source Node B. In parallel, the source Node B negotiates handoff with the target Node B. Before UE may start exchanging data on target Node B, UE transmits synchronization message towards the target node B. Synchronization message consists of access preamble and it is transmitted on RACH. Scrambling sequence is a function of target cell ID as its MAC ID. When uplink synchronization is achieved, target Node B sends access grant to UE.

Figure 4:
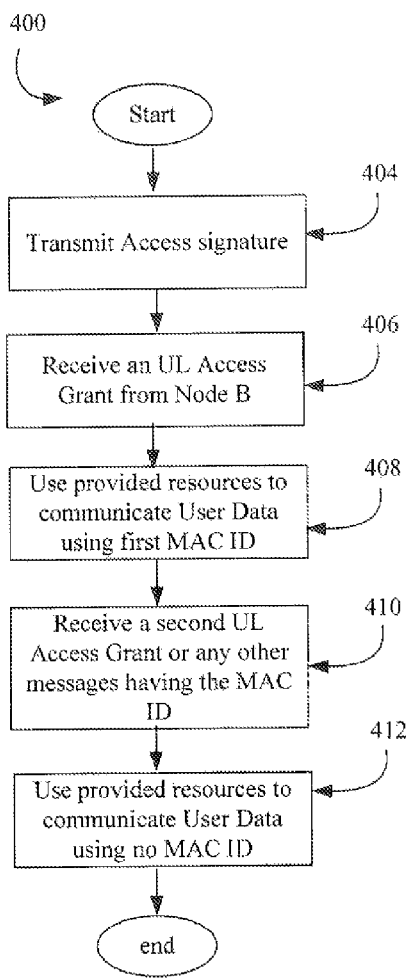
FIG. 4 is a methodology that facilitates a fast access procedure in a wireless communication system in accordance with various aspects set forth herein.
Figure 5:
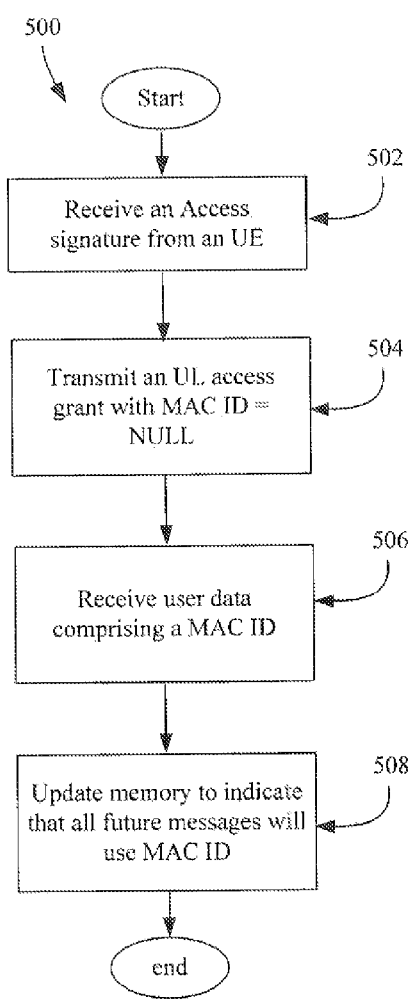
FIG. 5 is an example methodology that facilitates receiving an access probe in a wireless communications system.

In another aspect, methodologies illustrated in FIG. 4-5 may be applied for synchronization. Turning specifically to FIG. 4, a methodology 400 that facilitates a fast access procedure in a wireless communication system (for example, OFDM or OFDMA systems) is illustrated. The method may be used for synchronization when terminal has lost synchronization or is not in sync with access network or handoff. The method 400 is executed upon the terminal determining that it is not in sync with access network. The terminal may loose sync with access network if terminal transitioned into sleep mode from active mode, deep fading, or during a handoff procedure. In an aspect, the method starts at 404, the access terminal transmits an access signature (may be referred to as access probe) to the access network (Node B). In an aspect, the access probe is transmitted on random access channel (RACH). The access probe may include downlink C/I information, channel quality indicator feedback, QoS related information, Random ID, Cell ID or MAC ID flag. Since this method is for re-synchronization, the terminal may already have MAC ID and does not need a new MAC ID from the access network. In an aspect, the MAC ID flag of access probe may be set to indicate that a new MAC ID is not desired or the MAC ID flag is not used.

After transmitting the access probe the method moves to 406, the terminal receives an UL access grant from access network (Node B) in response to the access probe. In an aspect, the first UL grant message received in response to the access probe may contain information about UL resources, timing parameters to adjust the timing and a MAC ID portion. In an aspect, the MAC ID portion may be set to NULL (for example a series of zeros or any pattern used for indicating unusable data) for the first UL grant message received in response to the access probe. The terminal may ignore the processing of the MAC ID portion of the grant message. Where the MAC ID portion is not NULL (access network has assigned a new MAC ID), the terminal may continue to ignore the new MAC ID and use any previously assigned MAC ID stored in memory. If a terminal does not have an assigned MAC ID, then terminal may use the MAC ID from the access grant message. In another aspect, the access network may provide the MAC ID extracted from the memory based on information from the access probe. In this aspect, the UL grant message may comprise different set of parameters and the terminal would process the MAC ID portion the difference UL grant message.

Referring to 408, using the received parameters from access grant, establishing communication with access network wherein the terminal begins communicating user data. In an aspect, the terminal provides its MAC ID when transmitting on uplink shared channel. The access network may store this MAC ID in memory. At 410, the terminal receives a second or subsequent UL access grant message from access network. The terminal processes the MAC ID portion of all UL grant messages received subsequent to receiving first UL access grant message (discussed at 406). Thereafter, at 412, the terminal transmits user data on uplink shared channel, but does not provide the MAC ID as part of subsequent user data transmissions.

With reference now to FIG. 5, an example methodology 500 that facilitates receiving an access probe in a wireless communications system. The method begins at 502, an access probe is received. If the access probe is successfully detected, then the method moves to 504. At 504, the access network generates an access grant. The access grant is associated with the access probe and user information from the received access probe. The access network determines the parameters to provide to the terminal associated with the access probe to the terminal to exchange data with the access network. The access grant, among other things, comprises uplink resource assignment and uplink adjustments. In an aspect, the access probe may include a MAC ID flag. If the MAC ID flag is part of the access probe and is set (thus the terminal is requesting access network to assign a MAC ID), then a MAC ID may be included as part of the access grant message. In another aspect, the access probe does not include any indication that a MAC ID is request. In this aspect, the MAC ID portion of the UL access grant message, transmitted in response to access probe indicating that MAC ID is not required, provides MAC ID as NULL. In another aspect, the access probe comprises a first indicator. If the first indicator is set, then the access network determines the access probe as a zero rate request and the access network may only provide timing adjustment or power adjustment. At 506, the access network receives a first message after the access grant. The first message may contain MAC ID or user data. At 508, the access network updates memory to indicate that all future messages, for example a second UL access grant message will use received MAC ID.

Figure 6:
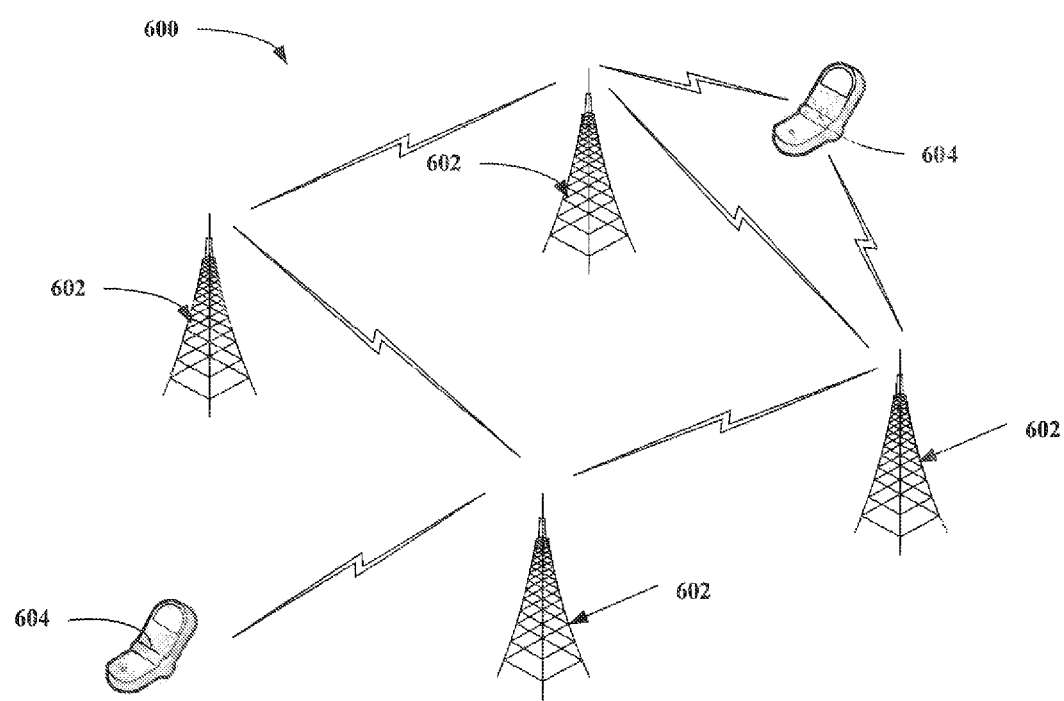
FIG. 6 illustrates a wireless communication system in accordance with various embodiments presented herein.

Referring now to FIG. 6, a wireless communication system 600 is illustrated in accordance with various embodiments presented herein. System 600 can comprise one or more base stations 602 (e.g., access points) in one or more sectors that receive, transmit, repeat, etc., wireless communication signals to each other and/or to one or more mobile devices 604. Each base station 602 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 604 can be, for example, cellular phones, smart phones, laptops, handheld communication devices, handheld computing devices, satellite radios, global positioning systems, PDAs, and/or any other suitable device for communicating over wireless communication system 600.

Base stations 602 can broadcast content to mobile devices 604 by employing OFDM or OFDMA techniques. Frequency division based techniques such as OFDM typically separate the frequency spectrum into distinct channels; for instance, the frequency spectrum may be split into uniform chunks of bandwidth (frequency range). OFDM effectively partitions the overall system bandwidth into multiple orthogonal frequency channels. The frequency channels may use Sync or Async HARQ assignments, depending on the system requirements. Additionally, an OFDM system may use time and/or frequency division multiplexing to achieve orthogonality among multiple data transmissions for multiple base stations 602.

Figure 7A:
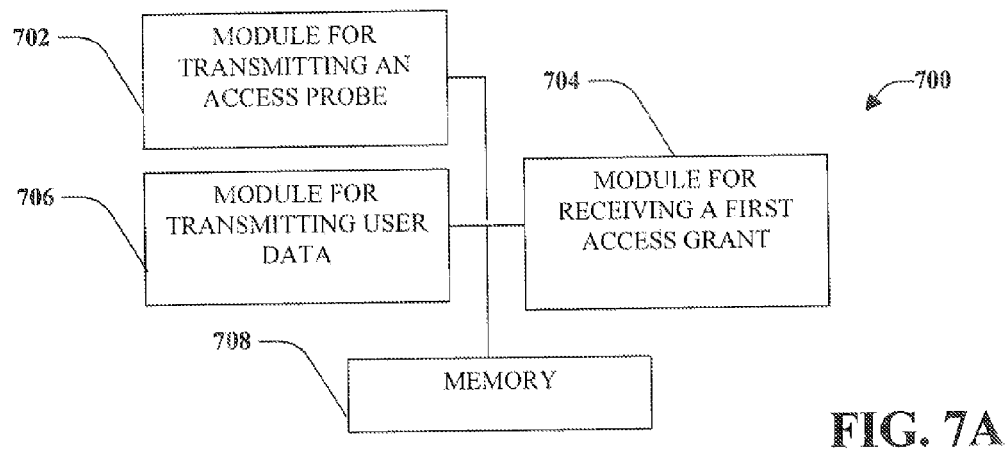
FIGS. 7A and 7B illustrates systems that facilitates fast access in a wireless communication.

Referring now to FIG. 7A, a system 700 that facilitates fast access in a wireless communication is illustrated. System 700 may include a module 702 for generating an access probe, a module 704 for receiving a first access grant and module 706 for transmitting user data. Modules 702, 704 and 706 may be a processor or any electronic device and may be coupled to memory module 708.

Figure 7B:
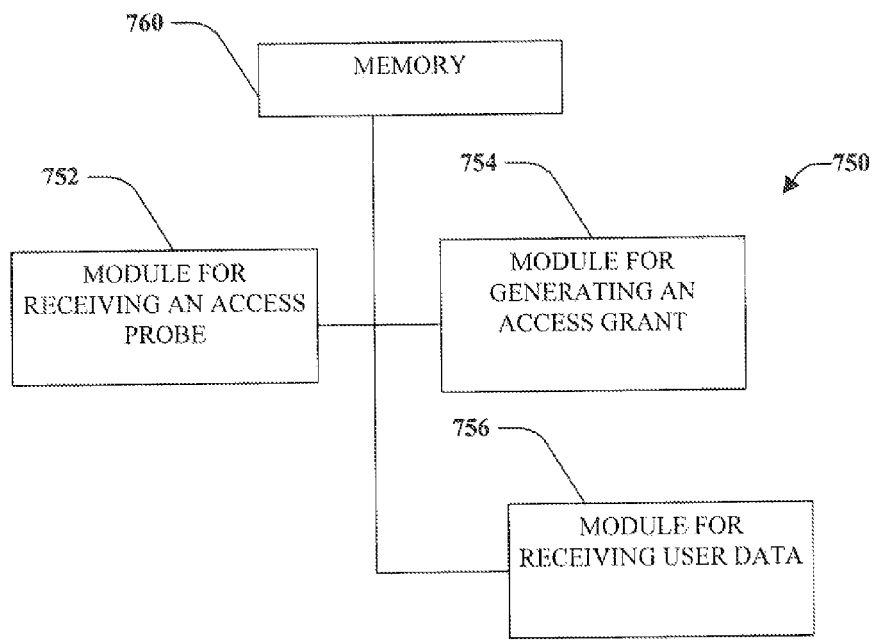

Referring now to FIG. 7B, a system 750 that facilities fast access in a wireless communication is illustrated. System 750 may include a module 752 for receiving an access probe, a module 754 for generating an access grant in response to the receive access probe, and a module 756 for receiving user data. Modules 752-756 may be a processor or any electronic device an may be coupled to memory module 760.

Figure 8:
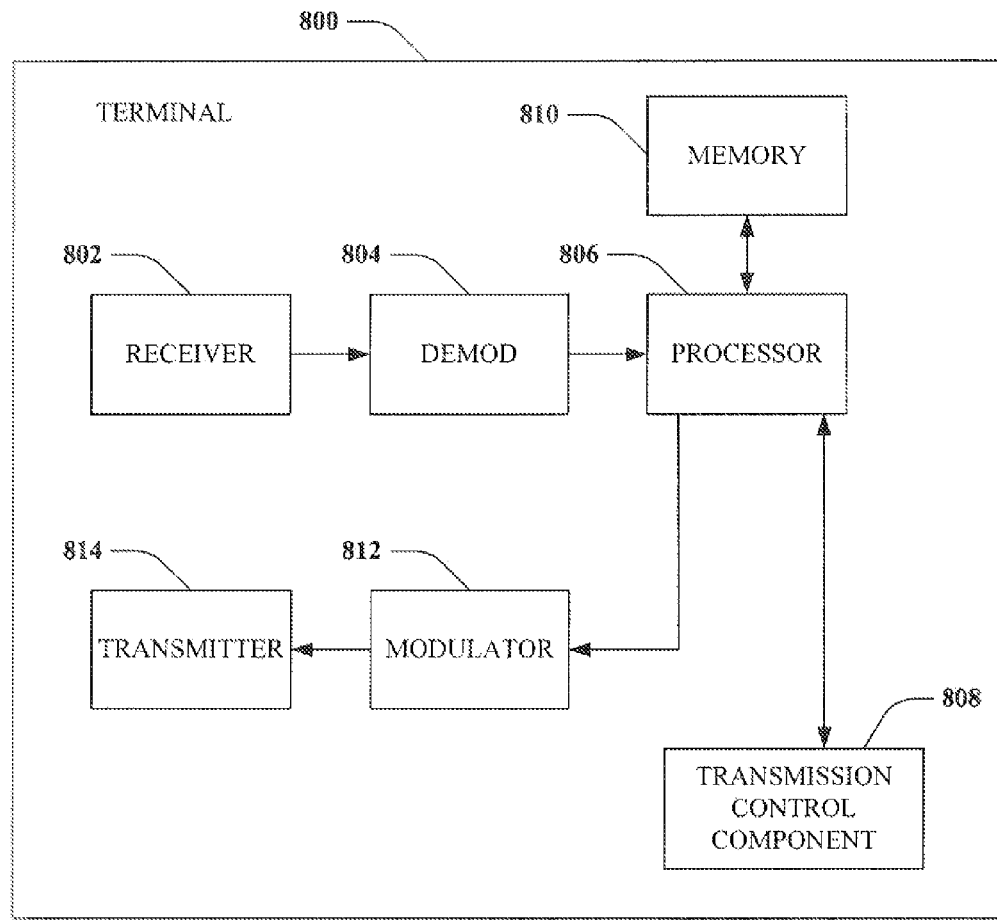
FIG. 8 illustrates a terminal or user device that provides for other sector communication in a wireless communication environment in accordance with one or more aspects set forth herein.

FIG. 8 is an illustration of a terminal or user device 800 that provides for other sector communication in a wireless communication environment in accordance with one or more aspects set forth herein. Terminal 800 comprises a receiver 802 that receives a signal, for instance one or more receive antennas, and performs typical actions (e.g., filters, amplifies, downconverts, etc.) the received signal and digitizes the conditioned signal to obtain samples. A demodulator 804 can demodulate the samples and provide received pilot symbols to a processor 806.

Processor 806 can be a processor dedicated to analyzing information received by receiver component 802 and/or generating information for transmission by a transmitter 814. Processor 806 can be a processor that controls one or more components of terminal 800, and/or a processor that analyzes information received by receiver 802, generates information for transmission by a transmitter 814, and controls one or more components of terminal 800. Processor 806 can utilize any of the methodologies described herein, including those described with respect to FIGS. 2-3.

In addition, terminal 800 can include a transmission control component 808 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 808 can be incorporated into the processor 806. It is to be appreciated that transmission control component 808 can include transmission control code that performs analysis in connection with determining receipt of acknowledgement.

Terminal 800 can additionally comprise memory 810 that is operatively coupled to processor 806 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory. Processor 806 is connected to a symbol modulator 812 and transmitter 814 that transmits the modulated signal.

Figure 9:
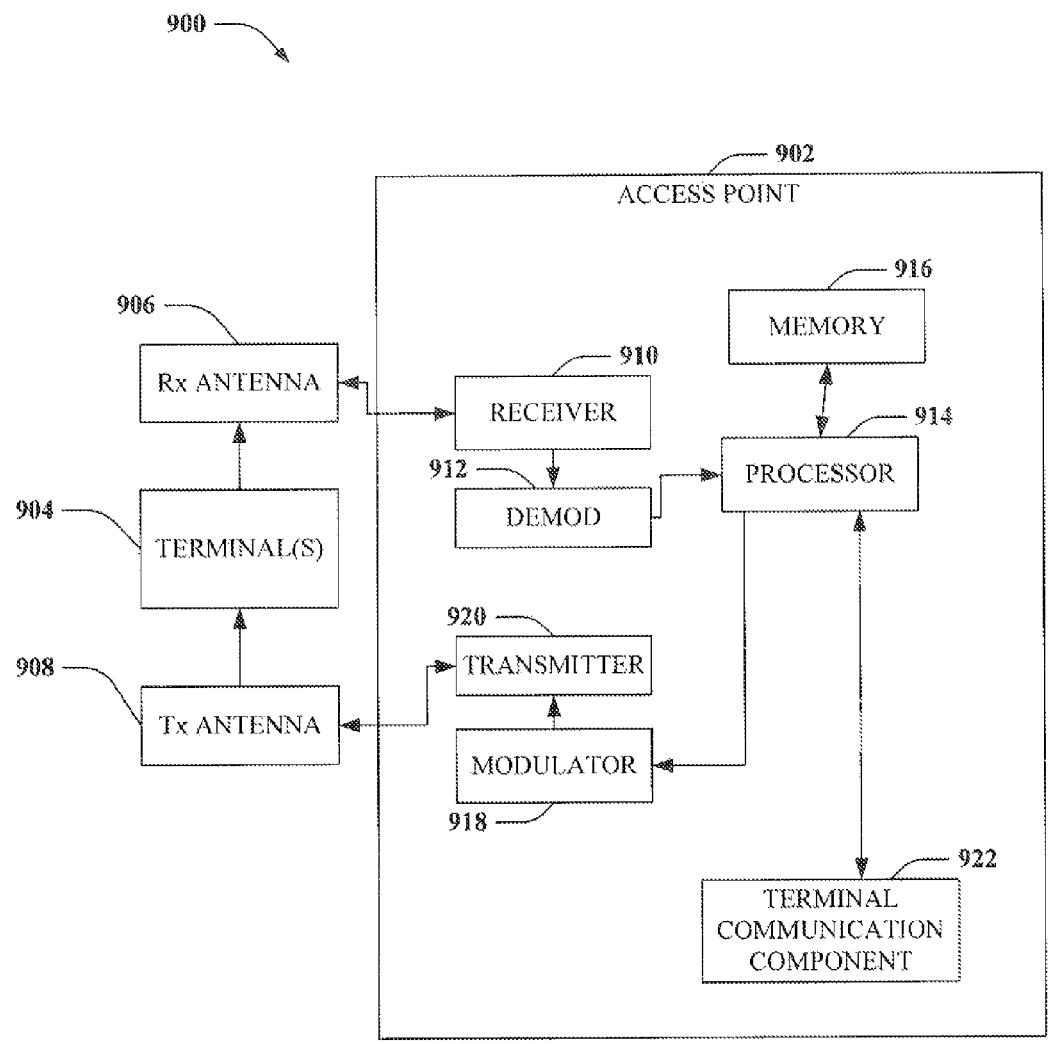
FIG. 9 is an illustration of a system that facilitates other sector communication in a communication environment in accordance with various aspects.

FIG. 9 is an illustration of a system 900 that facilitates other sector communication in a communication environment in accordance with various aspects. System 900 comprises an access point 902 with a receiver 910 that receives signal(s) from one or more terminals 904 through one or more receive antennas 906, and transmits to the one or more terminals 904 through a plurality of transmit antennas 908. Terminals 904 can include those terminals supported by the access point 902, as well as terminals 904 supported by neighboring sectors. In one or more aspects, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 914 that is similar to the processor described above with regard to FIG. 10, and is coupled to a memory 916 that stores information related to terminals, assigned resources associated with terminals and the like. Receiver output for each antenna can be jointly processed by receiver 910 and/or processor 914. A modulator 918 can multiplex the signal for transmission by a transmitter 920 through transmit antennas 908 to terminals 904.

Access point 902 further comprises a terminal communication component 922, which can be a processor distinct from, or integral to, processor 914. Terminal communication component 922 can obtain resource assignment information for terminals supported by neighboring sectors. In addition, terminal communication component 922 can provide assignment information to neighboring sectors for terminals supported by access point 902. Assignment information can be provided via backhaul signaling.

Based upon information regarding assigned resources, terminal communication component 922 can direct detection of transmissions from terminals supported by neighboring sectors, as well as decoding of received transmissions. Memory 916 can maintain packets received from terminals prior to receipt of the assignment information necessary for decoding of packets. Terminal communication component 922 can also control transmission and receipt of acknowledgements indicating successful reception and decoding of transmissions. It is to be appreciated that terminal communication component 922 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 10:
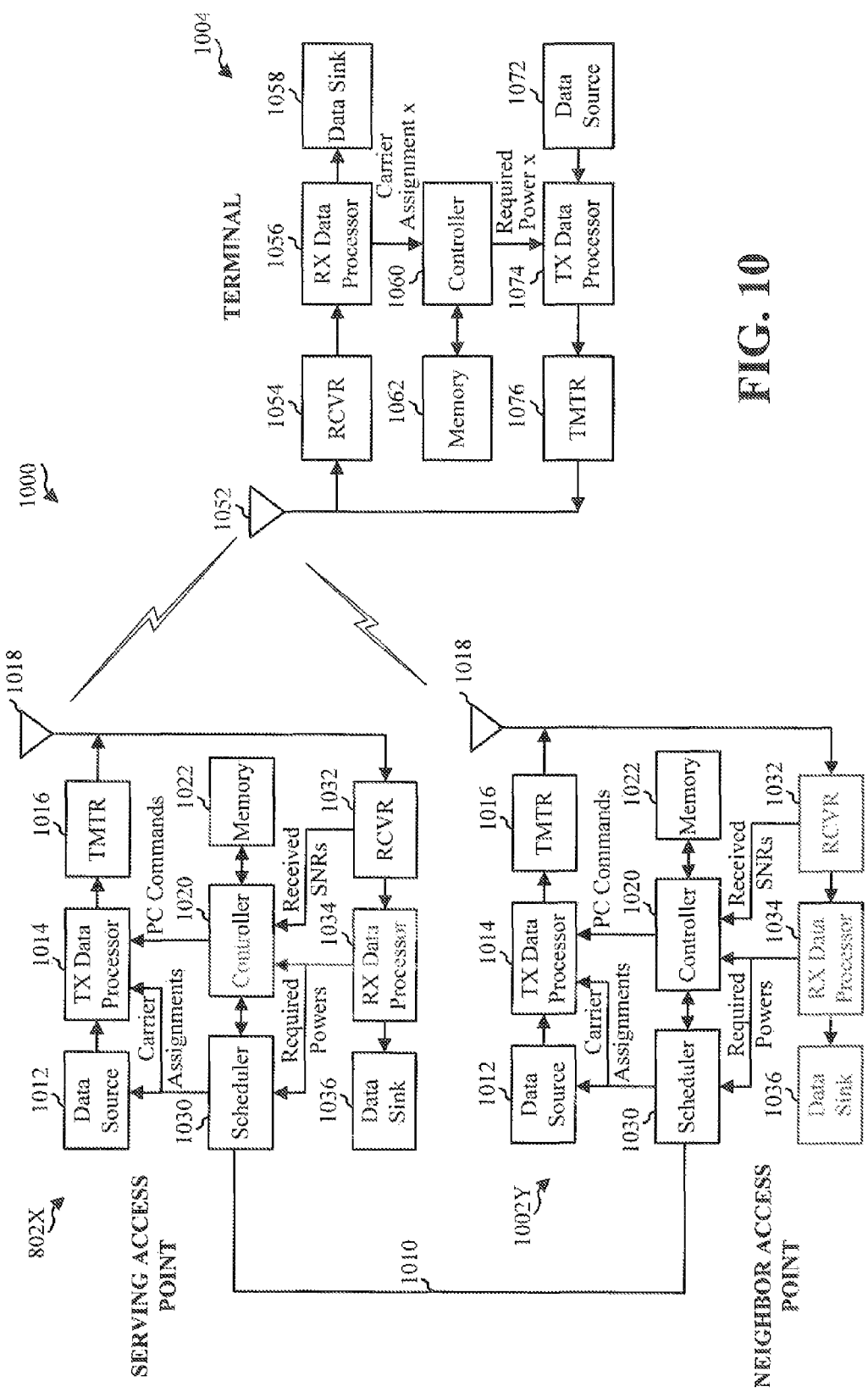
FIG. 10 illustrates an exemplary wireless communication system in accordance with various aspects.

FIG. 10 shows an exemplary wireless communication system 1000. The wireless communication system 600 depicts one terminal and two access points for sake of brevity. However, it is to be appreciated that the system can include one or more access point and/or more than one terminal, wherein additional access points and/or terminals can be substantially similar or different from the exemplary access points and terminal described below. In addition, it is to be appreciated that the access points and/or the terminal can employ the systems (FIGS. 1, 4-9) and/or methods (FIGS. 2-3) described herein.

FIG. 10 shows a block diagram of a terminal 1004, a serving access point 1002X point that supports terminal 1024 and a neighbor access point 1002Y in multiple-access multi-carrier communication system 1000. At access point 1002X, a transmit (TX) data processor 1014 receives traffic data (i.e., information bits) from a data source 1012 and signaling and other information from a controller 1020 and a scheduler 1030. For example, scheduler 1030 may provide assignments of carriers for the terminals. Additionally, a memory 1022 can maintain information regarding current or previous assignments. TX data processor 1014 encodes and modulates the received data using multi-carrier modulation (e.g., OFDM) to provide modulated data (e.g., OFDM symbols). A transmitter unit (TMTR) 1016 then processes the modulated data to generate a downlink modulated signal that is then transmitted from an antenna 1018.

Prior to transmission of assignment information to terminal 1004, scheduler can provide assignment information to access point 1002Y. The assignment information can be provided via backhaul signaling (e.g., a T1 line) 1010. Alternatively, assignment information can be provided to access point 1002Y after transmission to terminal 1004.

At terminal 1004, the transmitted and modulated signal is received by an antenna 1052 and provided to a receiver unit (RCVR) 1054. Receiver unit 1054 processes and digitizes the received signal to provide samples. A received (RX) data processor 1056 then demodulates and decodes the samples to provide decoded data, which may include recovered traffic data, messages, signaling, and so on. The traffic data may be provided to a data sink 1058, and the carrier assignment information for the terminal 1004 is provided to a controller 1060.

Controller 1060 directs data transmission on the uplink using the specific carriers that have been assigned to terminal 1004 and indicated in the received carrier assignment. A memory 1062 can maintain information regarding assigned resources (e.g., frequency, time and/or code) and other related information.

For terminal 1004, a TX data processor 1074 receives traffic data from a data source 1072 and signaling and other information from controller 1060. The various types of data are coded and modulated by TX data processor 1074 using the assigned carriers and further processed by a transmitter unit 1076 to generate an uplink modulated signal that is then transmitted from antenna 1052.

At access points 1002X and 1002Y, the transmitted and modulated signals from terminal 1004 are received by antenna 1018, processed by a receiver unit 1032, and demodulated and decoded by an RX data processor 1034. Transmitted signals can be decoded based upon assignment information generated by serving access point 1002X and provided to neighbor access point 1002Y. In addition, access points 1002X and 1002Y can generate an acknowledgement (ACK) that can be provided to the other access point (1002X or 1002Y) and/or to terminal 1004. The decoded signals can be provided to a data sink 1036. Receiver unit 1032 may estimate the received signal quality (e.g., the received signal-to-noise ratio (SNR) for each terminal and provide this information to controller 1020. RX data processor 1034 provides the recovered feedback information for each terminal to controller 1020 and scheduler 1030.

Scheduler 1030 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 1020 and 1060, TX andd RX processors 1014 and 1034, and so on) for these techniques may be implemented within one or more application specific integrated circuits (ASICs), digital signal processors (DSPs), digitial signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either detailed description or the claims, such term is intended to be inclusive in a manner similar to the term "comprising" as "comprising" is interpreted when employed as a transitional word in a claim.

What is claimed is:

1. A method of fast access in a wireless communication system performed by a user equipment, the method comprising:
   transmitting an access probe;
   transmitting a second access probe at an increased transmission power when a first access grant is not received within a first time period;
   receiving the first access grant, wherein the first access grant comprises a portion representing a randomly selected first terminal identification; and
   transmitting a message using a second terminal identification, wherein the second terminal identification is not equal to the randomly selected first terminal identification, and wherein the second terminal identification is a previously assigned terminal identification stored in a memory.

2. The method of claim 1, further comprising receiving a second access grant comprising a first Media Access Control Identifier (MAC ID), wherein the first MAC ID is equal to the second terminal identification.

3. The method of claim 2, further comprising transmitting subsequent user data without transmitting the first MAC ID.

4. The method of claim 1, further comprising determining if synchronization with an access network is lost prior to the transmitting the access probe.

5. The method of claim 1, further comprising determining if a state of a terminal is sleep mode prior to the transmitting the access probe.

6. A method of fast access in a wireless communication system performed by a base station, the method comprising:
   receiving an access probe;
   receiving a second access probe transmitted at an increased transmission power when an access grant is not received by a user equipment (UE) within a predetermined time period;
   generating the access grant in response to receiving the access probe, wherein the access grant comprises a portion representing a randomly selected first terminal identification; and
   receiving a message comprising a second terminal identification that is not included in the access grant.

7. The method of claim 6, further comprising transmitting a second access grant comprising the second terminal identification extracted from the message.

8. The method of claim 7, further comprising receiving subsequent user data without the randomly selected first terminal identification.

9. The method of claim 6, further comprising transmitting a second access grant comprising the randomly selected first terminal identification extracted from memory.

10. An apparatus operable in a wireless communication system, the apparatus comprising:
    means for transmitting an access probe;
    means for transmitting a second access probe at an increased transmission power when a first access grant is not received within a first time period;
    means for receiving the first access grant, wherein the first access grant comprises a portion representing a randomly selected first identification for the apparatus; and
    means for transmitting a message using a second identification for the apparatus, wherein the second identification is not equal to the randomly selected first identification, and wherein the second terminal identification is a previously assigned terminal identification stored in a memory.

11. The apparatus of claim 10, further comprising means for receiving a second access grant comprising a first Media Access Control Identifier (MAC ID), wherein the MAC ID is equal to the second identification.

12. The apparatus of claim 11, further comprising means for transmitting subsequent user data without transmitting the MAC ID.

13. The apparatus of claim 10, further comprising means for determining if synchronization with an access network is lost prior to the transmitting the access probe.

14. The apparatus of claim 10, further comprising means for determining if a state of the apparatus is sleep mode prior to transmitting the access probe.

15. An apparatus operable in a wireless communication system, the apparatus comprising:
    means for receiving an access probe;
    means for receiving a second access probe transmitted with an increased transmission power when an access grant is not received by a user equipment (UE) within a predetermined time period;
    means for generating the access grant in response to receiving the access probe, wherein the access grant comprises a portion representing a randomly selected first terminal identification; and
    means for receiving a message comprising a second terminal identification that is not included in the access grant.

16. The apparatus of claim 15, further comprising means for transmitting a second access grant comprising the second terminal identification extracted from the message.

17. The apparatus of claim 16, further comprising means for receiving subsequent user data without transmitting the randomly selected first terminal identification.

18. The apparatus of claim 15, further comprising means for transmitting a second access grant comprising the randomly selected first terminal identification extracted from memory.

19. A non-transitory computer readable medium having stored thereon computer executable instructions for:
   transmitting, by a user equipment (UE), an access probe;
   transmitting, by the UE, a second access probe at an increased transmission power when a first access grant is not received within a first time period;
   receiving, by the UE, the first grant message, wherein the first grant message comprises a portion representing a randomly selected first terminal identification; and
   transmitting, by the UE, a message using a second terminal identification, wherein the second identification is not equal to the randomly selected first terminal identification, and wherein the second terminal identification is a previously assigned terminal identification stored in a memory.

20. A non-transitory computer readable medium having stored thereon computer executable instructions for:
   receiving, by a base station (BS), an access probe;
   receiving, by the BS, a second access probe transmitted with an increased transmission power when an access grant is not received by a user equipment (UE) within a predetermined time period;
   generating, by the BS, the access grant in response to receiving the access probe wherein the access grant comprises a portion representing a randomly selected first terminal identification; and
   receiving, by the BS, a message comprising a second terminal identification that not included in the access grant.

21. An integrated circuit comprising:
   means for transmitting an access probe;
   means for transmitting a second access probe at an increased transmission power when a first access grant is not received within a first time period;
   means for receiving the first grant message, wherein the first grant message comprises a portion representing a randomly selected first terminal identification; and
   means for transmitting a message using a second terminal identification, wherein the second terminal identification is not equal to the randomly selected first terminal identification, and wherein the second terminal identification is a previously assigned terminal identification stored in a memory.

22. An integrated circuit comprising:
   means for receiving an access probe;
   means for receiving a second access probe transmitted with an increased transmission power when an access grant is not received by a user equipment (UE) within a predetermined time period;
   means for generating the access grant in response to receiving the access probe, wherein the access grant comprises a portion representing a randomly selected first terminal identification; and
   means for receiving a message comprising a second terminal identification that is not included in the access grant.

23. An electronic device operable in a wireless communication system, the electronic device comprising:
   a transmitter configured to transmit an access probe and transmit a second access probe at an increased transmission power when a first grant message is not received within a first time period;
   a receiver configured to receive the first grant message, wherein the first grant message comprises a portion representing a randomly selected first identification for the electronic device; and
   wherein the transmitter is further configured to transmit a message using a second identification for the electronic device, wherein the second identification is not equal to the randomly selected first identification, and wherein the second identification is a previously assigned identification stored in a memory of the electronic device.

24. An electronic device operable in a wireless communication system, the electronic device comprising:
   a receiver configured to receive an access probe and a second access probe transmitted with an increased transmission power when an access grant is not received by a user equipment (UE) within a predetermined time period;
   a processor configured to generate the access grant in response to receiving the access probe, wherein the access grant comprises a portion representing a randomly selected first terminal identification; and
   wherein the receiver is further configured to receive a message comprising a second terminal identification that is not included in the access grant.

* * * * *